United States Patent Office 3,146,829
Patented Sept. 1, 1964

3,146,829
METHOD AND COMPOSITION FOR WELL COMPLETION
Robert L. Mann, Ponca City, Okla., assignor to Continental Oil Company, Ponca City, Okla., a corporation of Delaware
No Drawing. Filed Aug. 10, 1961, Ser. No. 130,473
18 Claims. (Cl. 166—12)

This invention relates to the well completion method of consolidating subterranean formations traversed by vertical well bores and compositions for use in accomplishing these methods. More particularly, this invention is directed to a method of completion and compositions of siliceous cement having the normal attributes of a cement, together with a high degree of permeability upon setting which is achievable at formation temperatures in a reasonable time.

The drilling of well bores into subterranean formations for purposes of recovering the fluids contained therein such as oil and gas often entails the necessity of obtaining these fluids from such formations which are incompetent. These formations are often incompetent due to the absence of nautrally-occuring bonding materials for the particles within the formation, such particles as loose sand, which are therefore produced into the well bore to such an extent that production becomes inhibited due to the flow of such particles.

The problem of controlling the undesirable separation and movement of unconsolidated particles during production operations has plagued the industry for a number of years, and there has been no entirely satisfactory resolution of the problem, though many attempts have been made. One general approach is exemplified by the number of mechanical devices which have been developed, such as screens, filters, liners, chokes, etc., to prevent the production of these undesirable particles; but they have been generally unsatisfactory in inhibiting the flow of such particles.

Another general approach to the problem has been to consolidate the formation by the placement of some type of a binding agent or material into the formation by a squeeze operation to actually consolidate only the loose particles within the formation near the well bore. These materials, normally in the liquid state, such as plastics or sodium silicates, are injected into the formation to bind the loose particles therein.

A further approach is the placement of a permeable mass or barrier in the well bore and the adjacent formation which includes an aggregate component rather than binding solely the formation particles, such as the placement of a permeable cement deposit. Among the permeable cement compositions utilized are those incorporating Portland cement, particularly those using an aggregate and some type of component having natural permeability such as pozzolan, or those containing a gas-emitting constituent in the cement to create permeability in otherwise impermeable compositions. The use of silicate cements, and particularly sodium silicates in combination with an acid treatment and flush is well known to establish cement compositions, but these silicates normally establish an impermeable plug or barrier in the subterranean reservoir. Sodium silicate has also been used in conjunction with mechanically coating gravel particles in combination with an acid treatment step, or in conjunction with the natural constituents within the formation to achieve a permeable deposit to obtain the same type of barrier of reduced permeability. It is also a well-known practice to utilize certain plastic compositions in multi-phase systems to obtain formation consolidations of a permeable nature. In actuality, there has been no generally accepted solution to the problem of providing a permeable cement structure for use in well completion in a subterranean reservoir.

The invention disclosed and claimed by this application is related to a co-pending application Serial No. 75,654, filed by the same inventor and directed to permeable siliceous cement. This co-pending application includes some different materials and varying proportional requirements for common materials, but the significant distinction is the teaching of said application that a complete particles size range, i.e., 100–200 mesh, should be eliminated to obtain a composition having the desired characteristics. The present application teaches the inclusion of such a particle size range, while achieving improved characteristics, especially an improvement in the permeability of the set composition. Other distinctions will be obvious from the following disclosure.

An object of this invention is to provide a method of forming a consolidating barrier in a portion of a well bore in communication with an incompetent formation adjacent the well bore to prevent the flow of sand particles during production operations.

A further object of this invention is to provide a method of establishing a permeable structure within fractures extending into the formation surrounding the well bore.

A still further object of this invention is to provide a method for applying permeable siliceous cement compositions having the requisite strength, stability, permeability, setting time, and pumpability to be used by the oil industry in fracturing and completion operations.

Another object of this invention is to provide a composition to form a consolidating barrier in a portion of a well bore in communication with an incompetent subterranean formation of a permeable material which can be mixed at the surface in conventional equipment and injected into the formation for a single phase reaction without the necessity of an acid flush or the like.

Another object of this invention is to provide a siliceous cement suspension in slurry form which sets as a stable suspension in solid form and displays high permeability characteristics when set, and formed articles made therefrom.

Other objects and advantages of the present invention will be apparent from the following detailed description and examples of application of the invention.

Stated broadly, the present invention may be defined as a method of completing a subterranean well bore traversing an incompetent formation by placing a stable slurry suspension of siliceous cement in the well bore into and adjacent said formation, consisting of a silicate, a siliceous aggregate of a selected particle size range, a stabilizing agent, and water, with an accelerator in some instances, said suspension remaining intact during the setting reaction and upon setting having the requisites, particularly permeability, for subterranean usage as set forth below, and formed articles made from said set suspension.

The method of completion of the present invention is generally directed to completing wells which traverse subterranean formations for the purpose of producing fluids from said formations, particularly hydrocarbons. The particular completion steps to which the present invention is directed are those wherein it is advantageous to place a permeable siliceous cement adjacent and into an incompetent formation for the purposes of preventing the production of sand particles therefrom concurrently with the fluid production. The method is an appropriate one for use in forming a consolidated permeable structure within or adjacent an incompetent formation which has been completed open hole at the bottom of the well bore, in casing cement operations wherein cement is pumped down the well bore and behind the casing to hold the casing and formation in place, in instances of squeeze cementing where a previously cemented casing and well bore are subjected to a subsequent deposition of permeable cement in and adjacent the formation, in the positoning of liners, and also in fracturing operations.

Subsequent to the preparation of the well bore and surrounding formation for the application of the particular well completion method, such as removing a portion of the sand in the instance of an open hole completion or perforating the casing and cement in those instances where it is necessary, the initial step of the present method is to mix a stable slurry suspension of the siliceous cement composition at the surface. This mixing step can be done in any suitable blending apparatus, normally standard oil field equipment is satisfactory. Upon incorporating the requisite constituents into a stable slurry suspension of siliceous cement, the suspension is then pumped down the well bore to the particular depth and displaced in and adjacent the formation, whereafter the well bore is closed in for an appropriate period of time, preferably in the order of 24 hours, to allow the suspension to set as permeable siliceous cement. Thereafter the well is returned to production, and the formation fluids are extracted without the concurrent production of unconsolidated particles.

The method applied to an open hole completion necessitates the removal of a portion of the unconsolidated formation by conventional means such as underreaming, bailing, etc., whereafter the stable slurry suspension of siliceous cement is displaced into the formation by pumping or dumping, dependent upon pressure conditions, the suspension down the well bore. After the suspension has set to form a permeable cement, production can be resumed through the plug, or a hole can be drilled in the permeable plug in order to facilitate production.

The application of the present method in an operation to cement casing necessitates pumping the stable slurry suspension of siliceous cement down the well bore and upwardly behind the casing contiguous with the formation. After sufficient setting time has elapsed, the casing must then be opened, by perforating, notching or the like in order to establish communication between the interior of the well bore and the set permeable cement to produce the formation fluids; or pre-perforated casing containing plugs can be placed in the well bore with the perforations adjacent the appropriate formation, said perforations being plugged with removable plugging means, such as aluminum or magnesium plugs which can be readily dissolved from the perforations with an acid or caustic to establish the necessary communication between the well bore and the permeable cement adjacent the formation. It is also possible to place merely a limited quantity of this suspension at a selected depth behind the casing by injecting a reduced amount after an initial amount of conventional cement and following it with a further injection of conventional cement to achieve selective placement of the permeable siliceous cement only in the previously incompetent producing formation.

In using this method for a squeeze cementing operation of a cased well bore, it is necessary that the casing, and any previously placed casing cement, be perforated in a conventional manner prior to the injection of the stable slurry suspension of siliceous cement down the well bore. Packing means should be placed in the well bore isolating the offending formation in order that sufficient pressures can be exerted on the suspension to displace it through the perforation and into the formation without filling the well bore. It is also possible to incorporate tubing liners having a coating or sheath of the permeable siliceous cement into the tubing string in a conventional manner, thereby avoiding the loose sand production.

The method of the present invention applied in a fracturing operation can be accomplished by injecting an amount of the stable slurry suspension of siliceous cement into the formation subsequent to a conventional fracturing operation, whereby a portion of the fracturing fluid is displaced by the suspension. The suspension can be pumped into the fracture either to the extent that it substantially fills the fracture or to the extent it fills a lesser portion immediately adjacent the well bore, that is, "tailing in" to the fracture for a distance in the order of about 5 to about 20 feet, whereafter the suspension is allowed to set as a permeable siliceous cement to provide a permeable deposit to prop the fracture open for producing the formation fluids without concurrent sand production.

In order to disclose the present invention most fully and comprehensively, it will be advantageous to discuss the requisite characteristics for a permeable consolidating composition which is to be used in subterranean formations. To be satisfactory for such use, a composition must comply with each of the requisites set forth, and failure to do so will render the composition inoperable for use in incompetent subterranean formations. Inability to comply with the inherent requirements for usage within a subterranean formation is the reason that no practical method and composition for oil field usage has been developed prior to the present invention.

The initial requisite of such a method is to have a pumpable cement composition, with the pumping time of the consolidating composition being set forth most concisely in API Bulletin RP–10B (1959) which in essence is a combination of the setting time and viscosity index correlated to the various depths at which the consolidation is to be made. It is essential that the stable slurry suspension have a viscosity less than the maximum viscosity set forth in said Bulletin as that which will enable the suspension to be discharged down the well and into the formation at the requisite depths with the presently available pumping equipment. It has been determined that the pumping requirements can be met only if the maximum viscosity of the cement is approximately 70 poises or less for lifting and 100 poises or less for pumping. The setting time of the suspension used in the present method must mandatorily be more than the time required for pumping in order to have the suspension in place prior to the occurrence of sufficient setting reaction to cause the viscosity to exceed pump capacities. This will enable the suspension to be lifted by the pumping equipment and displaced into the formation prior to the time that the viscosity becomes in excess of the capacities of the pumping equipment, thereby assuring that the suspension can be substantially displaced into or against the formation to avoid an undesirable portion of the suspension setting up in the well bore or equipment.

The setting time is that period of time necessary to obtain a substantial completion of the bonding reaction sufficiently to establish a stable siliceous cement which will withstand the conditions of normal production operations. There are other cements which might eventually have a sufficiently complete bonding reaction as to meet the other conditions of normal production operations, but the period of time is a critical factor. It is obviously important that the suspension should not set up too quickly, or it will result in filling the well bore and perhaps the pumping equipment with this consolidating composition in a set condition, necessitating an expensive removal from or abandonment of the surface and subsurface facilities.

Conversely, it is necessary that the setting time not be too extended, because of the expense of temporarily suspending the completion or production operations. It is, therefore, generally accepted that the setting time should not exceed 72 hours, and preferably the setting time should be within 24 hours in order that normal production activities can be resumed without excess expense and delay.

Subsequent to the placement and setting of the cement composition, it is mandatory that the resulting cement have sufficient strength and stability to withstand the forces exerted by pressures of the formation and erosive characteristics of the formation fluids during production activities. The cement should have sufficient stability to withstand the passage of any fluids, particularly water or brine, which may contact it for extended periods of time, and remain chemically stable without breaking down to any appreciable extent. The strength of the set composition should be sufficient to withstand any pressures exerted upon it during subsequent production operations, generally in the order of at least 100 p.s.i. compressive strength.

The primary requisite of the cement composition of the present invention is permeability, that is, the ability to allow fluid flow within its interconnected pore network. The present invention is directed to a stable slurry suspension and subsequent solid suspension of siliceous cement which can be placed adjacent and into the producing formations, and inability to obtain sufficient fluid conductivity therethrough completely defeats all preceding efforts. It is recommended that the cement composition have a permeability of at least 100 millidarcies, and preferably 500 millidarcies or greater.

Having set forth the desired characteristics of such a permeable cement composition, the composition of the present invention will now be set forth and discussed in detail. The siliceous aggregate incorporated in the cement composition of the present invention can be any aggregate which is a solid siliceous material having the requisite particle size distribution, preferably a sand, without the necessity of any particular particle configuration. The particle size is critical to the extent that a narrow range, within the broader range specified below, of particle size distribution increases the permeability of the cement, and conversely a broader range of particle sizes diminishes the permeability. The particle size range is critical to the extent that substantially all of the particles must be within a particular range, but it is not necessary that an intermediate range within the broad range be completely removed or absent from the aggregate to provide the necessary permeability.

Broadly, the particle size range of the aggregate is that range of aggregate, which will pass through a No. 5 mesh sieve (4.00 mm.) and has sufficient material in the No. 100 to 200 mesh range to form a stable slurry suspension in the presence of the other constituents thereof, all sieve sizes herein being U.S. series. Preferably the particle size range of the aggregate material is in the 5 to 200 mesh size range; and while the amount in the range from 100 to 200 mesh can vary widely, it is generally at least about 10 percent by weight of the aggregate and preferably from 20 to 60 percent by weight of the aggregate, though 100 percent of the aggregate in the range of No. 100 to 200 mesh will provide a satisfactory permeable cement. A particularly effective particle size range is that aggregate material which will pass through a No. 50 mesh sieve (0.297 mm.) and be retained on a No. 170 mesh sieve (0.088 mm.), with at least about 10 percent by weight and preferably 20 to 60 percent by weight of the aggregate less than No. 100 mesh size. Aggregate having a narrow particle size range within the above general range encompassing smaller particles, such as the preferred range, provides a less viscous slurry than an aggregate covering broadly the total size range, i.e., incorporating larger particles, since presence of larger particles requires the inclusion of more of the smaller particle sizes to achieve the suspension which results in substantially reduced permeability.

The invention discloses the use of an aggregate having a distribution of particle sizes, which avoids the necessity of substantially eliminating the particles of the aggregate within a size range intermediate of the broader range, the only requisite being that the aggregate be capable of forming a stable slurry suspension in the presence of the remaining constituents. This eliminates the necessity for selectively controlling the particle size distribution by sieving operations or selecting several grades of sand, to provide for the removal of specific size ranges, such as 100 to 200 mesh. Conversely it is understood that it may be possible to eliminate a narrow range of particles and retain the aggregate in an operable form, but this merely reduces the permeability of the set composition accordingly and does not avoid the true scope of this invention. Specifically, the inclusion of an aggregate having particle sizes less than No. 100 mesh must consistently include the normal distribution of particles in the No. 100-200 mesh size, at least to the extent that normal particle size distribution occurs at less than No. 100 mesh, not eliminating this narrow size range in favor of particles less than No. 200 mesh. The amount of aggregate to be included is the amount from about 45 to about 75 percent by weight of the suspension, preferably about 50 to 70 percent by weight thereof.

The carrier or suspending vehicle for the other constituents of the stable slurry suspension is water, which can be substantially any water, provided that it does not contain foreign materials of such nature or amount as would deleteriously affect the desired bonding reaction or setting time of the composition. The amount of water to be included is from about 15 to about 30% by weight of the total suspension, preferably 20 to 25% by weight thereof.

The bonding agent of the cement composition for the present inventive method is sodium silicate or potassium silicate, as processed in such a manner as to impart water solubility characteristics to it. Sodium silicates ($Na_2O:SiO_2$) are the preferable silicates from an economical and operational standpoint. The silicate constituent is commercially obtainable as a powder form in a hydrated condition, or as a liquid in which the water component has been previously incorporated to provide a solution of varying concentration. The preferred form is the hydrated form, because the sodium silicate solution can then be mixed at the site with any available water, thereby avoiding the disadvantages of handling, transporting, etc., the water and further the use of the powder form allows prepacking of all the constituents. This combination of the water and sodium silicate constituents of the cement composition provides an aqueous solution of sodium silicate which is the final carrier for the aggregate and other solid constituents. The sodium silicate is incorporated in the composition in an amount within the range from about 5% to about 25% by weight, preferably 8% to 15% by weight, with these weights being measured in terms of the sodium silicate in powder form and as a part of the total suspension. Any use of the silicate in a premixed solution or liquid form necessitates that the solute and solvent of such solution be present in amounts within ranges set forth separately herein for the sodium silicate and water respectively to ensure operability.

An increase in the ratio of sodium oxide to silicon dioxide in the silicate increases the alkalinity, which reduces the speed of the bonding reaction, thereby slowing the setting time. Accordingly, the converse of the foregoing makes it possible, by varying these ratios, to control the pumping time. This is particularly advantageous in instances where an extended pumping time is required, such as the placement of a large amount of the composition within the confines of a single cavity or form, or in a formation located at a greater depth.

The degree of alkalinity of the silicate is inversely proportional to the ratio of $Na_2O$ to $SiO_2$, with 1:1 being extremely alkaline. Lower alkalinity silicates have a faster setting time because of the rapidity with which colloidal silicic acid is precipitated. The converse applies for higher alkalinity silicates. The more alkaline silicates are more soluble, less viscous, and therefore require increased setting time because of the necessity of coming out of solution to form the ultimate bond. An increase in the alkalinity of the system increases the pumping time of the system. The range of ratios of sodium oxide to silicon dioxide for the sodium silicate of the present composition is from about 1:1.6 to about 1:3.6 parts of sodium oxide to silicon dioxide, preferably 1:2.0 to 1:2.6 parts sodium oxide to silicon dioxide.

This cement composition includes a stabilizing agent to achieve resistance in the set suspension to decomposition caused by the passage of formation fluids, especially water. The stabilizing agents act on the sodium silicates to form a more insoluble bond, said silicate is slightly soluble in water so the stabilizing agents convert the silicates to a more complex insoluble silicate. Any number of such agents can be used, but those preferred are the oxides of heavy metals, such as zinc, lead, iron, etc., the preferred agent being zinc oxide. These metal oxide stabilizing agents should have a particle size generally within the range set forth for the aggregate, but preferably in a finer or powder form, in order to maintain the suspension and be sufficiently reactive to achieve the bonding reaction. The stabilizing agent is incorporated in an amount from about 1.0 to about 6.0 percent, preferably 2.0 to 4.0 percent, by weight of the suspension except that the amount of stabilizing agent must be adjusted in the event that it is incorporated in conjunction with a combination stabilizing and accelerator as discussed below. The inclusion of larger amounts can be done without appreciable benefit because the suspension can incorporate only a limited amount of the agent, but any excess is economically unattractive and tends to reduce the permeability of the set composition due to the fixed particle size and relative insolubility in the suspension.

Optionally, an accelerator agent can be included in this cement composition in order to increase the speed of the bonding reaction and thusly shorten and control the setting time required to obtain the permeable mass at particular depths. The accelerators for the present inventive cement composition are those which release carbon dioxide at a slow rate, such as ammonium bicarbonate, sodium bicarbonate, and other bicarbonate salts to avoid flash setting while causing the composition to be capable of reacting at lower temperatures and thereby at reduced depths. This agent should have a particle size similar to that of the stabilizing agent and be incorporated in an amount from 0.0 to about 1.0 percent by weight of the suspension, in accordance with the specific conditions within a given formation, preferably 0.05 to 0.9% by weight.

In addition to the stabilizing agent and accelerator agent discussed above, there are a group of materials which function as a combination stabilizing and accelerator agent. These combination agents are the silicofluorides, such as sodium silicofluoride, which have a particle size similar to that of the stabilizing agent with the amount to be utilized being from 0.0 to about 3.0 percent by weight of the suspension, depending on the individual formation characteristics, preferably 0.4 to 2.5% by weight. These stabilizing, accelerator, and combination agents can be utilized individually or in any combination in order to obtain a composition that has sufficient stability and setting time to enable it to be utilized under the specific conditions of the formation being consolidated. The amount of material required to provide a stable composition upon setting and the amount of material required to provide requisite setting time can be readily determined for a particular application by trial by one skilled in the art utilizing the information and data presented in this disclosure.

The total amount of accelerator agent present in the formation, either as such or as a combination accelerator and stabilizing agent, must be sufficient to provide not only the setting of the suspension within a desired time interval, but also provide a suspension which will have the requisite pumpability characteristics. As a guide to the amount of accelerating material to be incorporated into a composition, a factor, herein referred to as the depth index (DI), has been developed to provide a means of determining the amount which will provide a slurry suspension that will have the requisite pumping and setting characteristics for a specific depth. Broadly, the DI factor may be developed by the following equation:

$$DI = 10,000 + \left( \frac{\text{Metallic oxide}}{Na_2O} \times \frac{(\text{Percent accelerator agent} + \text{percent combination accelerator and stabilizing agent})}{} \right)$$

Therefore, it is possible to incorporate known information into the above equation in order to determine the amount of accelerator for the formulation needed to obtain a workable composition with the necessary characteristics for the desired depth, for those situations wherein an accelerator agent is required.

The ranges of the amounts and particle sizes for the various constituents of the siliceous cement of the present invention have been set forth, however, it is necessary for composition to be adapted and applied to a number of specific formations. Applications of the composition to an individual formation requires that the composition be considered in light of the formation characteristics, particularly depth and in turn pumping time and temperature, as can be readily determined from conventional data available in the field. It will be understood that all of the reaction variables caused by the numerous constituents in the cement composition are substantially interdependent, and that arbitrary selection of a desired volume of a particular constituent restricts the limits of the ranges of the other materials to be included in the composition. These volumes and ranges can be readily determined by one skilled in the art upon becoming informed of the formation characteristics and applying the teachings of the present disclosure, though routine laboratory procedures evaluations may be utilized in the selection of the composition.

The information presented in Table I indicates specific composition formulations for compositions of the present invention.

The following information set forth in Table I indicates the extensive number of composition formulations within the teachings of the above disclosure. These formulations are obtained by weighing out the desired amounts of the constituents, both wet and dry, whereafter the wet component is placed in a conventional mechanical blender and the dry materials are then placed in the blender in random order, though the aggregate is preferably the ultimate material included in the blender. The materials are retained in the blender until a homogeneous mixture is achieved in order to obtain a stable suspension of the siliceous cement composition. The composition is then deposited into the requisite laboratory equipment, i.e., a portion is placed in a consistometer slurry cup for evaluation of the slurry properties by measuring the pumping viscosity and pumping time under simulated subterranean conditions and a further portion of such material is placed in a mold to obtain a set composition. The mold containing the composition is placed in conventional curing facilities where the tem-

Table I

| Sample No. | Na₂O percent | SiO₂ percent | Ratio, Na₂O:SiO₂ | Silicate, percent | Water, percent | Aggregate, percent | Accelerator Agent, percent | Stabilizing and Accelerator Agent, percent | Stabilizing Agent, percent |
|---|---|---|---|---|---|---|---|---|---|
| 1 | 3.98 | 8.75 | 1:2.2 | 12.73 | 23.20 | 60.60 | ---------- | 2.60 | 0.87 |
| 2 | 3.86 | 8.48 | 1:2.2 | 12.34 | 23.85 | 58.77 | ---------- | 1.68 | 3.36 |
| 3 | 3.45 | 9.39 | 1:2.7 | 12.84 | 23.38 | 61.13 | ---------- | 0.47 | 2.18 |
| 4 | 3.75 | 8.98 | 1:2.4 | 12.73 | 23.20 | 60.61 | 0.43 | 0.87 | 2.16 |
| 5 | 3.70 | 8.86 | 1:2.4 | 12.56 | 22.91 | 59.83 | 0.85 | 0.43 | 3.42 |
| 6 | 3.98 | 8.74 | 1:2.2 | 12.72 | 23.18 | 60.55 | 0.69 | 0.69 | 2.16 |
| 7 | 3.70 | 8.89 | 1:2.4 | 12.59 | 22.95 | 59.93 | 0.26 | 0.86 | 3.42 |
| 8 | 3.75 | 9.00 | 1:2.4 | 12.75 | 23.24 | 60.71 | 0.26 | 0.87 | 2.17 |
| 9 | 3.75 | 8.99 | 1:2.4 | 12.74 | 23.22 | 60.66 | 0.35 | 0.87 | 2.17 |
| 10 | 3.04 | 6.08 | 1:2.0 | 9.12 | 21.97 | 65.18 | ---------- | 1.40 | 2.33 |
| 11 | 3.75 | 9.01 | 1:2.4 | 12.76 | 23.26 | 60.76 | 0.35 | 0.69 | 2.17 |
| 12 | 3.61 | 7.22 | 1:2.0 | 10.83 | 23.36 | 62.17 | 0.71 | 0.71 | 2.72 |
| 13 | 3.75 | 8.99 | 1:2.4 | 12.74 | 23.22 | 60.66 | 0.35 | 0.87 | 2.17 |
| 14 | 3.99 | 8.77 | 1:2.2 | 12.76 | 23.76 | 60.76 | 0.35 | 0.69 | 2.17 |
| 15 | 3.39 | 7.47 | 1:2.2 | 10.86 | 23.42 | 62.33 | 0.27 | 0.89 | 2.23 |
| 16 | 3.76 | 9.01 | 1:2.4 | 12.77 | 23.28 | 60.82 | 0.26 | 0.70 | 2.17 |
| 17 | 3.85 | 8.92 | 1:2.3 | 12.72 | 23.87 | 60.10 | 0.26 | 0.86 | 2.15 |
| 18 | 5.13 | 8.20 | 1:1.6 | 13.33 | 24.12 | 57.62 | ---------- | 1.64 | 3.29 |
| 19 | 3.99 | 8.77 | 1:2.2 | 12.76 | 23.26 | 60.76 | 0.18 | 0.87 | 2.17 |
| 20 | 3.72 | 8.91 | 1:2.4 | 12.63 | 24.14 | 60.14 | 0.09 | 0.86 | 2.15 |
| 21 | 3.93 | 9.43 | 1:2.4 | 13.36 | 24.36 | 63.64 | 0.18 | 0.72 | 2.27 |
| 22 | 3.76 | 9.02 | 1:2.4 | 12.78 | 23.30 | 60.87 | 0.44 | 0.44 | 2.17 |
| 23 | 3.76 | 9.02 | 1:2.4 | 12.78 | 23.30 | 60.87 | 0.87 | ---------- | 2.17 |
| 24 | 3.71 | 8.91 | 1:2.4 | 12.62 | 23.00 | 60.09 | 0.86 | ---------- | 3.43 |
| 25 | 3.71 | 8.91 | 1:2.4 | 12.62 | 23.00 | 60.08 | ---------- | 0.86 | 3.43 |
| 26 | 3.76 | 9.03 | 1:2.4 | 12.79 | 23.32 | 60.92 | 0.09 | 0.70 | 2.18 |
| 27 | 3.76 | 9.03 | 1:2.4 | 12.79 | 23.32 | 60.92 | 0.26 | 0.43 | 2.16 |
| 28 | 3.72 | 8.92 | 1:2.4 | 12.64 | 23.04 | 60.19 | ---------- | 0.69 | 3.44 |
| 29 | 3.94 | 8.68 | 1:2.2 | 12.62 | 23.00 | 60.08 | ---------- | 0.86 | 3.43 |
| 30 | 3.77 | 9.03 | 1:2.4 | 12.80 | 23.34 | 60.98 | ---------- | 0.70 | 2.18 |
| 31 | 3.72 | 8.92 | 1:2.4 | 12.64 | 23.04 | 60.19 | 0.69 | ---------- | 3.44 |
| 32 | 3.77 | 9.03 | 1:2.4 | 12.80 | 23.34 | 60.98 | 0.70 | ---------- | 2.14 |
| 33 | 3.73 | 8.96 | 1:2.4 | 12.69 | 24.01 | 60.45 | 0.26 | 0.43 | 2.16 |
| 34 | 3.72 | 8.93 | 1:2.4 | 12.65 | 23.06 | 60.24 | 0.17 | 0.43 | 3.44 |
| 35 | 3.75 | 8.99 | 1:2.4 | 12.75 | 23.83 | 60.66 | 0.17 | 0.43 | 2.17 |
| 36 | 3.77 | 9.06 | 1:2.4 | 12.83 | 23.39 | 61.08 | 0.09 | 0.44 | 2.18 |
| 37 | 3.71 | 8.91 | 1:2.4 | 12.62 | 23.00 | 60.09 | ---------- | ---------- | 4.29 | perature and pressure is controlled in order that the material can be cured for the desired period of time. Upon completion of the necessary curing the mold is removed from the curing facilities and the set composition is then subjected to a series of evaluations, such as strength, permeability and stability, by means of conventional laboratory procedures and equipment.

The information as to the physical properties, as discussed above, for the compositions set forth in Table I is contained below in Table II.

From the foregoing data it can be seen that the cement compositions of the present invention provide a permeable cement capable of being used in subterranean formations, and more specifically, this invention discloses a permeable cement having greatly improved permeability characteristics over the teachings of the art.

While particular embodiments of the invention have been set forth herein, it will be understood that the invention is not limited thereto since many modifications may be made, and it is therefore contemplated to cover by the

Table II

| Sample No. | Maximum Pumping Depth (feet) | Pumping Viscosity (Poise) | 80° F. | Setting 100° F. | Characteristics 140° F. | 180° F. | Stability | Permeability |
|---|---|---|---|---|---|---|---|---|
| 1 | 2,000 | 9 | set | set | set | set | fair | 2,480 |
| 2 | 2,000 | 11 | ---------- | set | set | set | fair | 1,590 |
| 3 | 2,000+ | 26 | ---------- | ---------- | set | set | good | 4,750 |
| 4 | 2,000 | 17 | ---------- | set | set | set | good | 1,550 |
| 5 | 2,000 | 17 | ---------- | set | set | set | good | 3,440 |
| 6 | 2,000 | 20 | set | set | set | set | good | 2,105 |
| 7 | 3,000 | 14 | set | set | set | set | good | 2,560 |
| 8 | 2,000 | 15 | set | set | set | set | good | 2,870 |
| 9 | 4,000 | 17 | ---------- | set | set | set | good | 2,110 |
| 10 | 5,000 | 16 | ---------- | ---------- | set | set | good | 2,110 |
| 11 | 4,000+ | 22 | ---------- | set | set | set | good | 1,750 |
| 12 | 6,000+ | 19 | ---------- | ---------- | set | set | fair | 4,140 |
| 13 | 4,000 | 27 | ---------- | ---------- | set | set | good | 2,090 |
| 14 | 4,000+ | 16 | ---------- | set | set | set | good | 2,010 |
| 15 | 6,000 | 13 | ---------- | ---------- | set | set | fair | 3,860 |
| 16 | 6,000+ | 11 | ---------- | set | set | set | good | 2,610 |
| 17 | 10,000+ | 15 | ---------- | ---------- | set | set | good | 1,145 |
| 18 | 10,000+ | 18 | ---------- | ---------- | ---------- | set | good | 3,694 |
| 19 | 10,000+ | 11 | ---------- | ---------- | set | set | good | 1,790 |
| 20 | 10,000+ | 20 | ---------- | ---------- | set | set | good | 2,660 |
| 21 | 6,000 | 19 | ---------- | ---------- | set | set | good | 2,050 |
| 22 | 4,000+ | 33 | ---------- | ---------- | set | set | good | 1,545 |
| 23 | 6,000 | 23 | ---------- | ---------- | set | set | good | 3,850 |
| 24 | 4,000 | 22 | ---------- | ---------- | set | set | fair | 2,300 |
| 25 | 6,000 | 15 | ---------- | ---------- | set | set | fair | 2,660 |
| 26 | 10,000+ | 15 | ---------- | ---------- | set | set | good | 3,100 |
| 27 | 6,000+ | 6 | ---------- | set | set | set | good | 2,560 |
| 28 | 10,000 | 15 | ---------- | ---------- | set | set | good | 2,700 |
| 29 | 10,000+ | 6 | ---------- | ---------- | ---------- | set | fair | 3,350 |
| 30 | 10,000+ | 5 | ---------- | ---------- | set | set | good | 3,150 |
| 31 | 10,000 | 14 | ---------- | ---------- | set | set | good | 3,827 |
| 32 | 10,000+ | 26 | ---------- | ---------- | set | set | good | 3,250 |
| 33 | 10,000+ | 25 | ---------- | ---------- | set | set | fair | 1,560 |
| 34 | 10,000 | 11 | ---------- | ---------- | set | set | good | 2,920 |
| 35 | 10,000+ | 13 | ---------- | ---------- | set | set | good | 4,420 |
| 36 | 10,000+ | 11 | ---------- | ---------- | set | set | fair | 1,880 |
| 37 | 10,000+ | 18 | ---------- | ---------- | ---------- | set | fair | 2,320 | appended claims any such modifications as fall within the true spirit and scope of the invention.

The invention having thus been described, it is intended to be limited solely by the language of the following claims.

I claim:
1. A stable slurry suspension of siliceous cement consisting essentially of a siliceous aggregate having a particle size range that will pass through a No. 5 mesh sieve in an amount from about 45 to about 75 percent by weight of said suspension, said aggregate having at least about 10 percent by weight of particles in the range from No. 100 to No. 200 mesh, a sodium silicate having a ratio of sodium oxide to silicon dioxide from 1:1.6 to 1:3.0 in an amount from about 5 to about 25 percent by weight of said suspension, a stabilizing agent having a particle size within the range of said aggregate in an amount from about 1 to about 6 percent by weight of said suspension, and water in an amount from about 15 to about 30 percent by weight of said suspension, said suspension forming a permeable siliceous cement composition upon setting.

2. A stable slurry suspension of siliceous cement consisting essentially of a siliceous aggregate having a particle size range that will pass through a No. 5 mesh sieve in an amount from about 45 to about 75 percent by weight of said suspension, said aggregate having at least about 10 percent by weight of particles in the range from No. 100 to No. 200 mesh, a sodium silicate having a ratio of sodium oxide to silicon dioxide from 1:1.6 to 1:3.0 in an amount from about 5 to about 25 percent by weight of said suspension, a stabilizing agent having a particle size within the range of said aggregate in an amount from about 1 to about 6 percent by weight of said suspension, water in an amount from about 15 to about 30 percent by weight of said suspension and an accelerator agent having a particle size within the range of said aggregate in an amount not to exceed about 1 percent by weight of said suspension, said suspension forming a permeable cement composition upon setting.

3. A stable slurry suspension of siliceous cement consisting essentially of a siliceous aggregate having a particle size range that will pass through a No. 5 mesh sieve in an amount from about 45 to about 75 percent by weight of said suspension, said aggregate having at least about 10 percent by weight of particles in the range from No. 100 to No. 200 mesh, a sodium silicate having a ratio of sodium oxide to silicon dioxide from 1:1.6 to 1:3.0 in an amount from about 5 to about 25 percent by weight of said suspension, a stabilizing agent having a particle size within the range of said aggregate in an amount from about 1 to about 6 percent by weight of said suspension, water in an amount from about 15 to about 30 percent by weight of said suspension, and a combination stabilizing and accelerator agent having a particle size within the range of said aggregate in an amount not to exceed about 3 percent by weight of said suspension, said suspension forming a permeable siliceous cement composition upon setting.

4. A stable slurry suspension of siliceous cement consisting essentially of a siliceous aggregate having a particle size range that will pass through a No. 5 mesh sieve, in an amount from about 45 to about 75 percent by weight of said suspension, said aggregate having at least about 10 percent by weight of particles in the range from No. 100 to No. 200 mesh, a sodium silicate having a ratio of sodium oxide to silicon dioxide from 1:1.6 to 1:3.0 in an amount from about 5 to about 25 percent by weight of said suspension, a stabilizing agent having a particle size within the range of said aggregate in an amount from about 1 to about 6 percent by weight of said suspension, water in an amount from about 15 to about 30 percent by weight of said suspension, an accelerator agent having a particle size within the range of said aggregate in an amount not to exceed about 1 percent by weight of said suspension, and a combination stabilizing and accelerator agent having a particle size within the range of said aggregate in an amount not to exceed about 3 percent by weight of said suspension, said suspension forming a permeable siliceous cement composition upon setting.

5. A stable slurry suspension of siliceous cement consisting essentially of a siliceous aggregate having a particle size from No. 5 to No. 200 mesh sieve size in an amount from about 45 to about 75 percent by weight of said suspension, said aggregate having at least about 10 percent by weight of particles in the range from No. 100 to No. 200 mesh, a sodium silicate having a ratio of sodium oxide to silicon dioxide from 1:1.6 to 1:3.0 in an amount from about 5 to about 25 percent by weight of said suspension, a stabilizing agent having a particle size within the range of said aggregate in an amount from about 1 to about 6 percent by weight of said suspension, and water in an amount from about 15 to about 30 percent by weight of said suspension, said suspension forming a permeable siliceous cement composition upon setting.

6. A stable slurry suspension of siliceous cement consisting essentially of a siliceous aggregate having a particle size from No. 5 to No. 200 mesh sieve size in an amount from about 45 to about 75 percent by weight of said suspension, said aggregate having at least about 10 percent by weight of particles in the range from No. 100 to No. 200 mesh, a sodium silicate having a ratio of sodium oxide to silicon dioxide from 1:1.6 to 1:3.0 in an amount from 5 to 25 percent by weight of said suspension, a stabilizing agent having a particle size within the range of said aggregate in an amount from about 1 to about 6 percent by weight of said suspension, water in an amount from about 15 to about 30 percent by weight of said suspension, and a combination stabilizing and accelerator agent having a particle size within the range of said aggregate in an amount not to exceed about 3 percent by weight of said suspension, said suspension forming a permeable siliceous cement composition upon setting.

7. A stable slurry suspension of siliceous cement consisting essentially of a siliceous aggregate having a particle size from No. 5 to No. 200 mesh sieve size in an amount from about 45 to about 75 percent by weight of said suspension, said aggregate having at least about 10 percent by weight of particles in the range from No. 100 to No. 200 mesh, a sodium silicate having a ratio of sodium oxide to silicon dioxide from 1:1.6 to 1:3.0 in an amount from 5 to 25 percent by weight of said suspension, a stabilizing agent having a particle size within the range of said aggregate in an amount from about 1 to about 6 percent by weight of said suspension, water in an amount from about 15 to about 30 percent by weight of said suspension, an accelerator agent having a particle size within the range of said aggregate in an amount not to exceed about 1 percent by weight of said suspension, and a combination stabilizing and accelerator agent having a particle size within the range of said aggregate in an amount not to exceed about 3 percent by weight of said suspension, said suspension forming a permeable siliceous cement composition upon setting.

8. A stable slurry suspension of siliceous cement consisting essentially of a siliceous aggregate having a particle size from No. 50 to No. 170 mesh sieve size in an amount from 50 to 70 percent by weight of said suspension, said aggregate having from 20 to 60 percent by weight of particles smaller than No. 100 mesh, a sodium silicate having a ratio of sodium oxide to silicon dioxide from 1:2.0 to 1:2.6 in an amount from 8 to 15 percent by weight of said ssuspension, a stabilizing agent having a particle size within the range of said aggregate in an amount from 2 to 4 percent by weight of said suspension, and water in an amount from 20 to 25 percent by weight of said suspension, said suspension forming a permeable siliceous cement composition upon setting.

9. A stable slurry suspension of siliceous cement consisting essentially of a siliceous aggregate having a particle size from No. 50 to No. 170 mesh sieve size in an amount from 50 to 70 percent by weight of said suspension, said aggregate having from 20 to 60 percent by weight of particles smaller than No. 100 mesh, sodium silicate having a ratio of sodium oxide to silicon dioxide from 1:2.0 to 1:2.6 in an amount from 8 to 15 percent by weight of said suspension, a stabilizing agent having a particle size within the range of said aggregate in an amount from 2 to 4 percent by weight of said suspension, water in an amount from 20 to 25 percent by weight of said suspension, and an accelerator agent having a particle size within the range of said aggregate in an amount from 0.05 to 0.9 percent by weight of said suspension, said suspension forming a permeable siliceous cement composition upon setting.

10. A stable slurry suspension of siliceous cement consisting essentially of a siliceous aggregate having a particle size from No. 50 to No. 170 mesh sieve size in an amount from 50 to 70 percent by weight of said suspension, said aggregate having from 20 to 60 percent by weight of particles smaller than No. 100 mesh, sodium silicate having a ratio of sodium oxide to silicon dioxide from 1:2.0 to 1:2.6 in the amount from 8 to 15 percent by weight of said suspension, a stabilizing agent having a particle size within the range of said aggregate in an amount from 2 to 4 percent by weight of said suspension, water in an amount from 20 to 25 percent by weight of said suspension, and a combination stabilizing and accelerator agent having a particle size within the range of said aggregate in an amount from 0.4 to 2.5 percent by weight of said suspension, said suspension forming a permeable siliceous cement composition upon setting.

11. A stable slurry suspension of siliceous cement consisting essentially of a siliceous aggregate having a particle size from No. 50 to No. 170 mesh sieve size in an amount from 50 to 70 percent by weight of said suspension, said aggregate having from 20 to 60 percent by weight of particles smaller than No. 100 mesh, a sodium silicate having a ratio of sodium oxide to silicon dioxide from 1:2.0 to 1:2.6 in the amount from 8 to 15 percent by weight of said suspension, a stabilizing agent having a particle size within the range of said aggregate in an amount from 2 to 4 percent by weight of said suspension, water in an amount from 20 to 25 percent by weight of said suspension, an accelerator agent having a particle size within the range of said aggregate in an amount from 0.05 to 0.9 percent by weight of said suspension, and a combination stabilizing and accelerator agent having a particle size within the range of said aggregate in an amount from 0.4 to 2.5 percent by weight of said suspension, said suspension forming a permeable siliceous cement composition upon setting.

12. A method of completing a well traversing an incompetent subterranean formation which comprises pumping a stable slurry suspension of siliceous cement into said well, said suspension consisting essentially of a siliceous aggregate having a particle size range that will pass through a No. 5 mesh sieve in an amount from about 45 to about 75 percent by weight of said suspension, said aggregate having at least about 10 percent by weight of particles in the range from No. 100 to No. 200 mesh, a sodium silicate having a ratio of sodium oxide to silicon dioxide from 1:1.6 to 1:3.0 in an amount from about 5 to about 25 percent by weight of said suspension, a stabilizing agent having a particle size within the range of said aggregate in an amount from about 1 to about 6 percent by weight of said suspension, and water in an amount from about 15 to about 30 percent by weight of said suspension; displacing said suspension from said well into contact with said formation; closing in said well for a period of time to allow the setting of said suspension, whereby a permeable siliceous cement composition is formed adjacent said well and formation thereby providing communication between said well and formation through said permeable cement.

13. A method of completing a well traversing an incompetent subterranean formation which comprises pumping a stable slurry suspension of siliceous cement into said well, said suspension consisting essentially of a siliceous aggregate having a particle size range that will pass through a No. 5 mesh sieve in an amount from about 45 to about 75 percent by weight of said suspension, said aggregate having at least about 10 percent by weight of particles in the range from No. 100 to No. 200 mesh, a sodium silicate having a ratio of sodium oxide to silicon dioxide from 1:1.6 to 1:3.0 in an amount from about 5 to about 25 percent by weight of said suspension, a stabilizing agent having a particle size within the range of said aggregate in an amount from about 1 to about 6 percent by weight of said suspension, water in an amount from about 15 to about 30 percent by weight of said suspension, an accelerator agent having a particle size within the range of said aggregate in an amount not to exceed about 1 percent by weight of said suspension, and a combination stabilizing and accelerator agent having a particle size within the range of said aggregate in a particle size not to exceed about 3 percent by weight of said suspension; displacing said suspension from said well into contact with said formation; closing in said well for a period of time to allow the setting of said suspension, whereby a permeable siliceous cement composition is formed adjacent said well and formation thereby providing communication between said well and formation through said permeable cement.

14. A method of completing an open hole well extending into an incompetent subterranean formation which comprises removing a portion of said formation; displacing a stable slurry suspension of siliceous cement into said well in contact with said formation, said suspension consisting essentially of a siliceous aggregate having a particle size that will pass through a No. 5 mesh sieve in an amount from about 45 to about 75 percent by weight of said suspension, said aggregate having at least about 10 percent by weight of particles in the range from No. 100 to No. 200 mesh, a sodium silicate having a ratio of sodium oxide to silicon dioxide from 1:1.6 to 1:3.0 in an amount from about 5 to about 25 percent by weight of said suspension, a stabilizing agent having a particle size within the range of said aggregate in an amount from about 1 to about 6 percent by weight of said suspension, water in an amount from about 15 to about 30 percent by weight of said suspension, an accelerator agent having a particle size within the range of said aggregate in an amount not to exceed about 1 percent by weight of said suspension, and a combination stabilizing and accelerator agent having a particle size of said aggregate in an amount not to exceed about 3 percent by weight of said suspension; closing in said well bore for a period of time to allow the setting of said suspension, whereby a permeable siliceous cement composition is formed; drilling out a portion of said composition thereby providing communication into said well and formation through said permeable cement.

15. A method of completing a well containing uncemented casing and traversing an incompetent subterranean formation which comprises pumping a conventional oil well cement into the annular space between the casing and the bore of said well and into contact with that portion of the casing and well bore above said formation; pumping a stable slurry suspension of siliceous cement into the annular space between the casing and the well bore and into contact with that portion of the casing and well bore adjacent said formation, said suspension consisting essentially of a siliceous aggregate having a particle size that will pass through a No. 5 mesh sieve in an amount from about 45 to about 75 percent by weight of said suspension, said aggregate having at least about 10 percent by weight of particles in the range from No. 100 to No. 200 mesh, a sodium silicate having a ratio of sodium oxide to silicon dioxide from 1:1.6 to 1:3.0 in an amount from about 5 to about 25 percent by weight of said suspension, a stabilizing agent having a particle size within the range of said aggregate in an amount from about 1 to about 6 percent by weight of said suspension, water in an amount from about 15 to about 30 percent by weight of said suspension, an accelerator agent having a particle size within the range of said aggregate in an amount not to exceed about 1 percent by weight of said suspension, and a combination stabilizing and accelerator agent having a particle size within the range of said aggregate in an amount not to exceed about 3 percent by weight of said suspension; pumping a conventional oil well cement into the annular space between the casing and the well bore into contact with that portion of the casing and well bore below said formation; closing in said well for a period of time to allow the setting of said suspension, whereby a permeable siliceous cement composition is formed adjacent said formation; perforating the casing within said well adjacent said formation thereby providing communication between said well and formation through said permeable cement.

16. A method of completing a cased well traversing an incompetent subterranean formation which comprises perforating the casing and cement adjacent said formation; inserting packing means within said casing adjacent the perforation to isolate a portion of said well bore; pumping a stable slurry suspension of siliceous cement into the isolated portion of said casing, said suspension consisting essentially of a siliceous aggregate having a particle size that will pass through a No. 5 mesh sieve in an amount from about 45 to about 75 percent by weight of said suspension, said aggregate having at least about 10 percent by weight of particles in the range from No. 100 to No. 200 mesh, a sodium silicate having a ratio of sodium oxide to silicon dioxide from 1:1.6 to 1:3.0 in an amount from about 5 to about 25 percent by weight of said suspension, a stabilizing agent having a particle size within the range of said aggregate in an amount from about 1 to about 6 percent by weight of said suspension, water in an amount from about 15 to about 30 percent by weight of said suspension, an accelerator agent having a particle size within the range of said aggregate in an amount not to exceed about 1 percent by weight of said suspension, and a combination stabilizing and accelerator agent having a particle size within the range of said aggregate in an amount not to exceed about 3 percent by weight of said suspension; squeezing said suspension into and adjacent said formation; closing in said well for a period of time to allow the setting of said suspension whereby a permeable siliceous cement composition is formed providing communication between said well and formation through said permeable cement.

17. A method of completing a well containing cemented casing and traversing an incompetent subterranean formation which comprises perforating said casing and cement adjacent said formation; inserting packing means within said casing substantially adjacent the perforation thereby isolating the portion of said well below the perforation; fracturing said formation through the perforation; pumping a stable slurry suspension of siliceous cement into substantially all of the fracture within said formation, said suspension consisting essentially of a siliceous aggregate having a particle size that will pass through a No. 5 mesh sieve in an amount from about 45 to about 75 percent by weight of said suspension, said aggregate having at least about 10 percent by weight of particles in the range from No. 100 to No. 200 mesh, a sodium silicate having a ratio of sodium oxide to silicon dioxide from 1:1.6 to 1:3.0 in an amount from about 5 to about 25 percent by weight of said suspension, a stabilizing agent having a particle size within the range of said aggregate in an amount from about 1 to about 6 percent by weight of said suspension, water in an amount from about 15 to about 30 percent by weight of said suspension, an accelerator agent having a particle size within the range of said aggregate in an amount not to exceed about 1 percent by weight of said suspension, and a combination stabilizing and accelerator agent having a particle size within the range of said aggregate in an amount not to exceed about 3 percent by weight of said suspension; closing in said well for a period of time to allow the setting of said suspension whereby a permeable siliceous cement composition is formed within said fracture.

18. A method of completing a well containing cemented casing and traversing an incompetent subterranean formation which comprises perforating said casing and cement adjacent said formation; inserting packing means within said casing substantially adjacent the perforation thereby isolating the portion of said well below the perforation; fracturing said formation; pumping a stable slurry suspension of siliceous cement into that portion of the fracture within said formation adjacent the well, said suspension consisting essentially of a siliceous aggregate having a particle size that will pass through a No. 5 mesh sieve in an amount from about 45 to about 75 percent by weight of said suspension, said aggregate having at least about 10 percent by weight of particles in the range from No. 100 to No. 200 mesh, a sodium silicate having a ratio of sodium oxide to silicon dioxide from 1:1.6 to 1:3.0 in an amount from about 5 to about 25 percent by weight of said suspension, a stabilizing agent having a particle size within the range of said aggregate in an amount from about 1 to about 6 percent by weight of said suspension, water in an amount from about 15 to about 30 percent by weight of said suspension, an accelerator agent having a particle size within the range of said aggregate in an amount not to exceed about 1 percent by weight of said suspension, and a combination stabilizing and accelerator agent having a particle size within the range of said aggregate in an amount not to exceed about 3 percent by weight of said suspension; closing in said well for a period of time to allow the setting of said suspension whereby a permeable siliceous cement composition is formed within said fracture immediately adjacent said well.

References Cited in the file of this patent

UNITED STATES PATENTS

| | | |
|---|---|---|
| 1,896,212 | Woods | Feb. 7, 1933 |
| 2,285,302 | Patterson | June 2, 1942 |
| 2,365,033 | Williams | Dec. 12, 1944 |
| 2,536,871 | Carlton | Jan. 2, 1951 |
| 2,914,413 | Mercer | Nov. 24, 1959 |